US010701896B1

United States Patent
Tsengas

(10) Patent No.: US 10,701,896 B1
(45) Date of Patent: Jul. 7, 2020

(54) ELEVATED ANIMAL FEEDER

(71) Applicant: OurPet's Company, Fairport Harbor, OH (US)

(72) Inventor: Steven Tsengas, Fairport Harbor, OH (US)

(73) Assignee: COSMIC PET LLC, Wichita, KS (US)

(*) Notice: Subject to any disclaimer, the term of this patent is extended or adjusted under 35 U.S.C. 154(b) by 52 days.

(21) Appl. No.: 15/591,227

(22) Filed: May 10, 2017

Related U.S. Application Data

(63) Continuation of application No. 14/594,150, filed on Jan. 11, 2015, now abandoned, and a continuation-in-part of application No. 29/574,987, filed on Aug. 20, 2016, now Pat. No. Des. 846,816.

(51) Int. Cl.
  *A01K 5/01*  (2006.01)
  *A01K 7/00*  (2006.01)

(52) U.S. Cl.
  CPC .............. *A01K 5/0114* (2013.01); *A01K 7/00* (2013.01)

(58) Field of Classification Search
  CPC .. A01K 5/0114; A01K 5/0107; A01K 5/0142; A01K 7/00; A47B 3/06; A47B 81/065; A47B 2009/006; A47B 2003/008; A47B 9/18; A47B 2200/0039
  USPC ............... 108/12, 147.22; 119/51.5, 61.5, 76
  See application file for complete search history.

(56) References Cited

U.S. PATENT DOCUMENTS

| | | | | | |
|---|---|---|---|---|---|
| 2,263,921 | A | * | 11/1941 | Gipson | A47B 85/04 108/12 |
| 2,615,770 | A | * | 10/1952 | Curtis | A47B 13/003 108/155 |
| 2,635,023 | A | * | 4/1953 | Frye | A47B 13/02 108/12 |
| 2,643,923 | A | * | 6/1953 | Beall | A47B 9/18 108/12 |
| 2,763,522 | A | * | 9/1956 | Berman | A47B 3/0809 297/135 |
| 2,845,896 | A | * | 8/1958 | Copeland | A01K 5/0114 119/51.01 |
| 3,744,845 | A | * | 7/1973 | Sooker | A47B 13/02 297/423.44 |
| 3,783,799 | A | * | 1/1974 | Dupuis | A47B 3/083 108/19 |
| 4,561,692 | A | * | 12/1985 | Yestadt | A47B 9/00 108/12 |
| 4,633,815 | A | * | 1/1987 | Peterson | A01K 13/004 119/72 |
| 4,699,089 | A | * | 10/1987 | Teschke | A01K 5/0114 119/51.5 |

(Continued)

*Primary Examiner* — Christopher D Hutchens
(74) *Attorney, Agent, or Firm* — Gugliotta & Gugliotta LPA

(57) ABSTRACT

An adjustable elevated feeder is provided having a platform for holding both a feeder and a water bowl. The underside of the platform surface has a pair of parallel disposed leg impingement slots formed therein. A pair of rectangular leg elements each having two dimension: a high dimension having a longer width and a low dimension having a shorter width. When the legs are press fitted into the slots about the shorter width, the high dimension raises the platform to an upper adjustment height. Alternately, when the legs are press fitted into the slots about the greater length, the low dimension lowers the platform to a lower adjustment height.

13 Claims, 5 Drawing Sheets

(56) References Cited

U.S. PATENT DOCUMENTS

| | | | | |
|---|---|---|---|---|
| 5,509,376 | A * | 4/1996 | Tsengas | A01K 5/0114 |
| | | | | 108/156 |
| 6,427,604 | B1 * | 8/2002 | Chrobak | A47B 9/00 |
| | | | | 108/12 |
| 7,341,019 | B1 * | 3/2008 | Tsengas | A01K 5/0114 |
| | | | | 119/61.5 |
| 2014/0373357 | A1 * | 12/2014 | Elliott | B23P 11/00 |
| | | | | 29/897 |
| 2015/0173504 | A1 * | 6/2015 | Price | A47B 3/06 |
| | | | | 108/185 |

* cited by examiner

ELEVATED ANIMAL FEEDER

RELATED APPLICATIONS

The present invention claims benefit of U.S. Provisional Application No. 61/974,502 filed on Apr. 3, 2014 and is a Continuation of U.S. Ser. No. 14/594,150 filed on Jan. 11, 2015, both incorporated by reference as if fully rewritten herein.

BACKGROUND OF THE INVENTION

1. Field of the Invention

The present invention relates to elevated feeding devices for domestic animals and, more particularly, to an improved elevated pet food and/or water bowl that can be positioned at various different fixed heights in order to accommodate various sized domestic animals.

2. Description of the Related Art

Elevated feeder assemblies for dogs have been available for and known to provide various health benefits for domestic animals, especially canines. Such benefits include improved posture, reduced neck strain, and improved digestion. One of the greatest benefits of using a raised pet feeder is improved pet posture. Both large and small dogs are prone to bone and joint strain, especially strains on the hip and shoulder areas. Using a raised pet feeder that encourages an ergonomically correct feeding position allows maximum comfort for the animal by maintaining a correct stance.

In addition to comfort, ensuring proper meal time posture further helps reduce stress on a dog's joints. Repetitive stress on domestic canines often can lead to severe problems such as osteoarthritis or cumulative degenerative disorder. Raised dog bowls for food or drink can minimize the stress and strain that can contribute to such conditions, and also makes dining more comfortable for senior canines or dogs already suffering from joint or bone disorders. Further, proper pet posture and improving comfort can result in reduced neck strain. This is true for pets of all sizes: larger pets will not have to bend down as far; and, smaller pets will not have to reach as high. Additionally, reducing neck strain can aid in digestion. When pets eat from raised dog feeders at the proper height with proper posture, it further aids in preventing unnecessary joint strain to the shoulder and canine wrist areas. Pets will be more prone to finish meals when they are dining at a comfortable level.

Several elevated animal feeding device for improving the posture and digestion of large dogs have been developed. To illustrate, U.S. Pat. No. 5,509,376, granted to Steven Tsengas, discloses an animal feeder assembly that provides food and water at an elevated position from a support surface. This makes it well suited for feeding large dogs in a manner which avoids digestive and posture problems. The feeder assembly comprises a feeder tray and a plurality of hollow legs that are each releasably attached to the feeder tray. An additional illustration is shown in U.S. Pat. No. 5,501,176, granted to Tara S. Tully, which discloses an animal feeder assembly that may also be adjusted for height, so that larger dogs may be fed in a convenient manner. The height of a tray, relative to a support surface, is adjustable by placing the free end a bracket indo into differently spaced slots.

However, the known feeder assemblies discussed above, as well as many others that are available, suffered from some standard shortcomings. In some instances, the animal feeder assembly has required several components that are difficult to manufacture and assemble. In other instances, the animal feeders have proven to be cumbersome and difficult to transport, and have required considerable shelf space. Also, some of the animal feeders have proven to be difficult to clean, and few of the animal feeders have provided for the storage of pet food. And finally, most of the animal feeders available to not provide for variations or adjustments in height such that the same assembly may correctly accommodate different sized domestic animals.

Consequently, a need exists for an improved adjustable, elevated pet feeder that is simple in design and operation provides for easy adjustment to more than one height in a knock-down (KD) or flat pack configuration in which the components are packaged in an economically and ergonomically convenient manner.

SUMMARY OF THE INVENTION

It is therefore an object of the present invention to provide an improved elevated feeding devices for domestic animals.

It is another object of the present invention to provide an improved elevated pet food and/or water bowl that can be positioned at various different fixed heights in order to accommodate various sized domestic animals.

It is yet another object of the present invention to provide an improved adjustable, elevated pet feeder that is simple in design and operation.

It is still another object of the present invention to provide such an elevated pet feeder designed for (mechanically) easy height adjustment.

It is still yet another object of the present invention to provide more than one height in a knock-down (KD) or flat pack configuration in which the components are packaged in an economically and ergonomically convenient manner.

Briefly described according to the preferred embodiment of the present invention, an adjustable elevated feeder is provided having a platform for holding both a feeder and a water bowl. The underside of the platform surface has a pair of parallel disposed leg impingement slots formed therein. A pair of rectangular leg elements each having two dimension: a high dimension having a longer width and a low dimension having a shorter width. When the legs are press fitted into the slots about the shorter width, the high dimension raises the platform to an upper adjustment height. Alternately, when the legs are press fitted into the slots about the greater length, the low dimension lowers the platform to a lower adjustment height.

The present raised feeder achieves comfort and health benefits similar to other raised feeders, but further allows for a simple adjustable height mechanism to accommodate for use with domestic animals, and especially dogs, of various sizes. This is accomplished without the need for a retailer to inventory additional stock keeping units (SKU's). Further, the overall form factor of the legs accommodates a "knock down" shipping configuration.

Other advantages and novel features of the present invention will become apparent in the following detailed description of the invention when considered in conjunction with the accompanying drawings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1A:
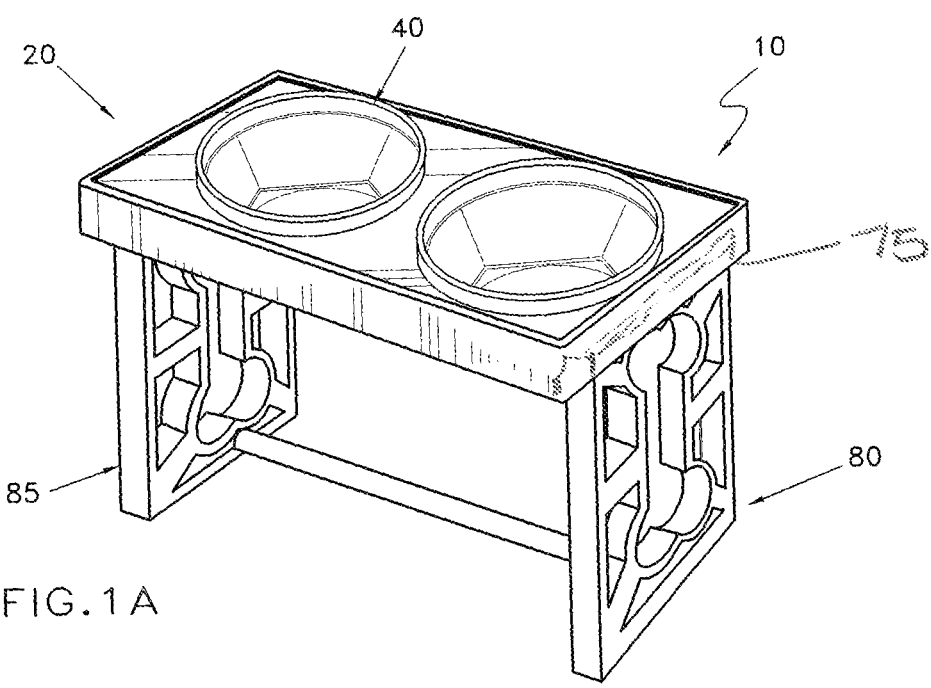
FIG. 1a and FIG. 1b are front perspective views of an improved elevated pet feeder according to the preferred embodiment of the present invention and shown configured with a first height setting.
Figure 1B:
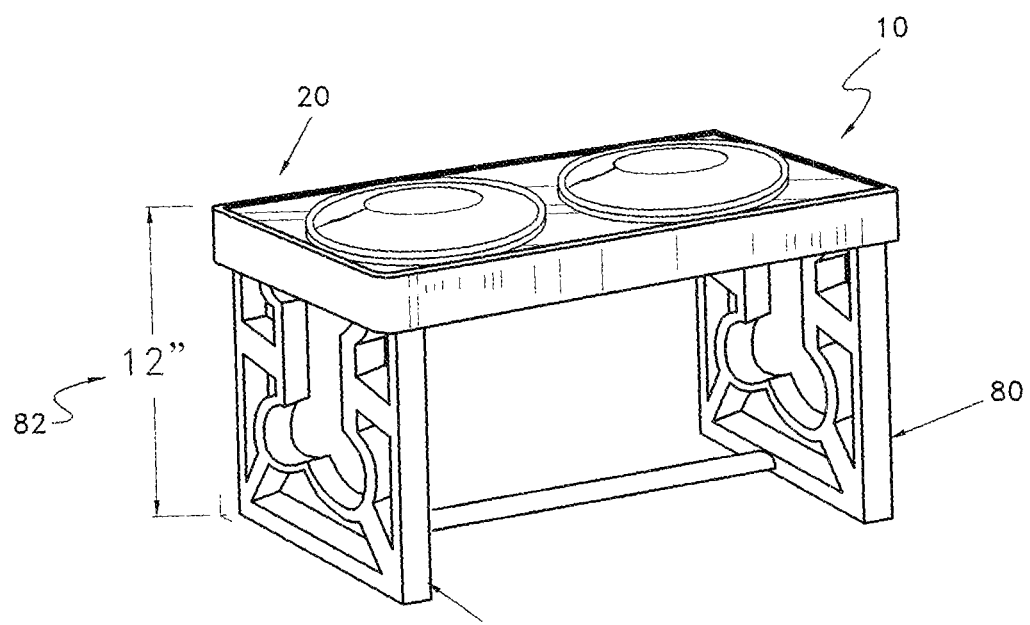
Figure 2A:
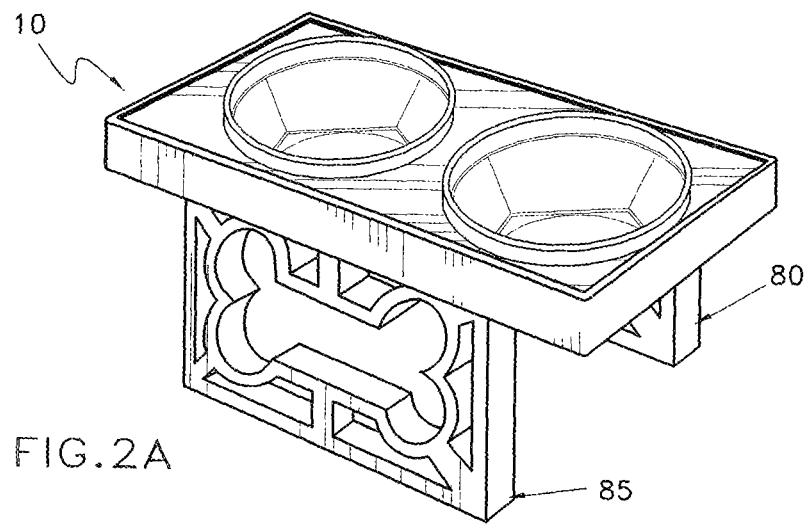
FIG. 2a and FIG. 2b are a front perspective view of an improved elevated pet feeder according to the preferred embodiment of the present invention and shown configured with a second height setting.
Figure 2B:
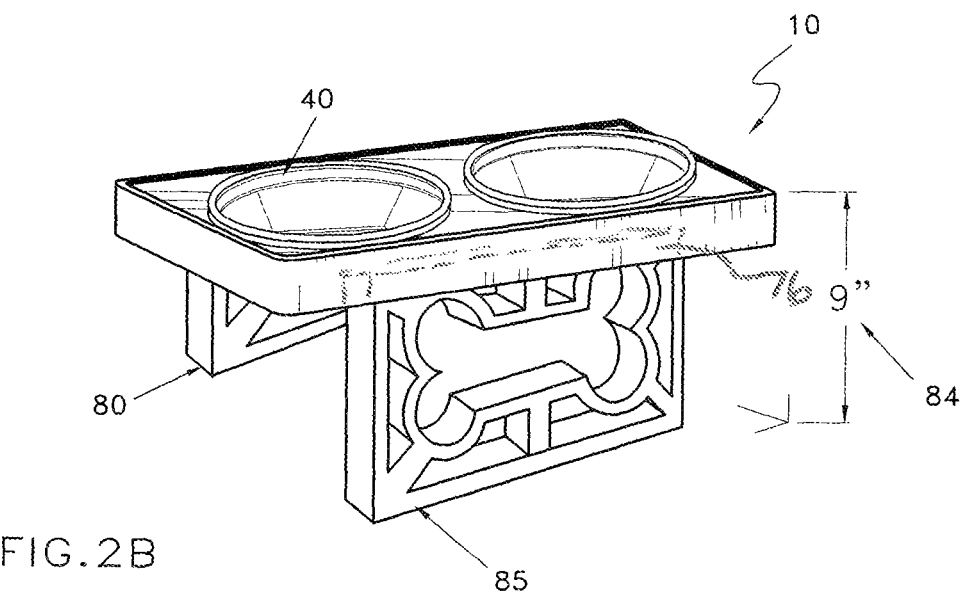
Figure 3:
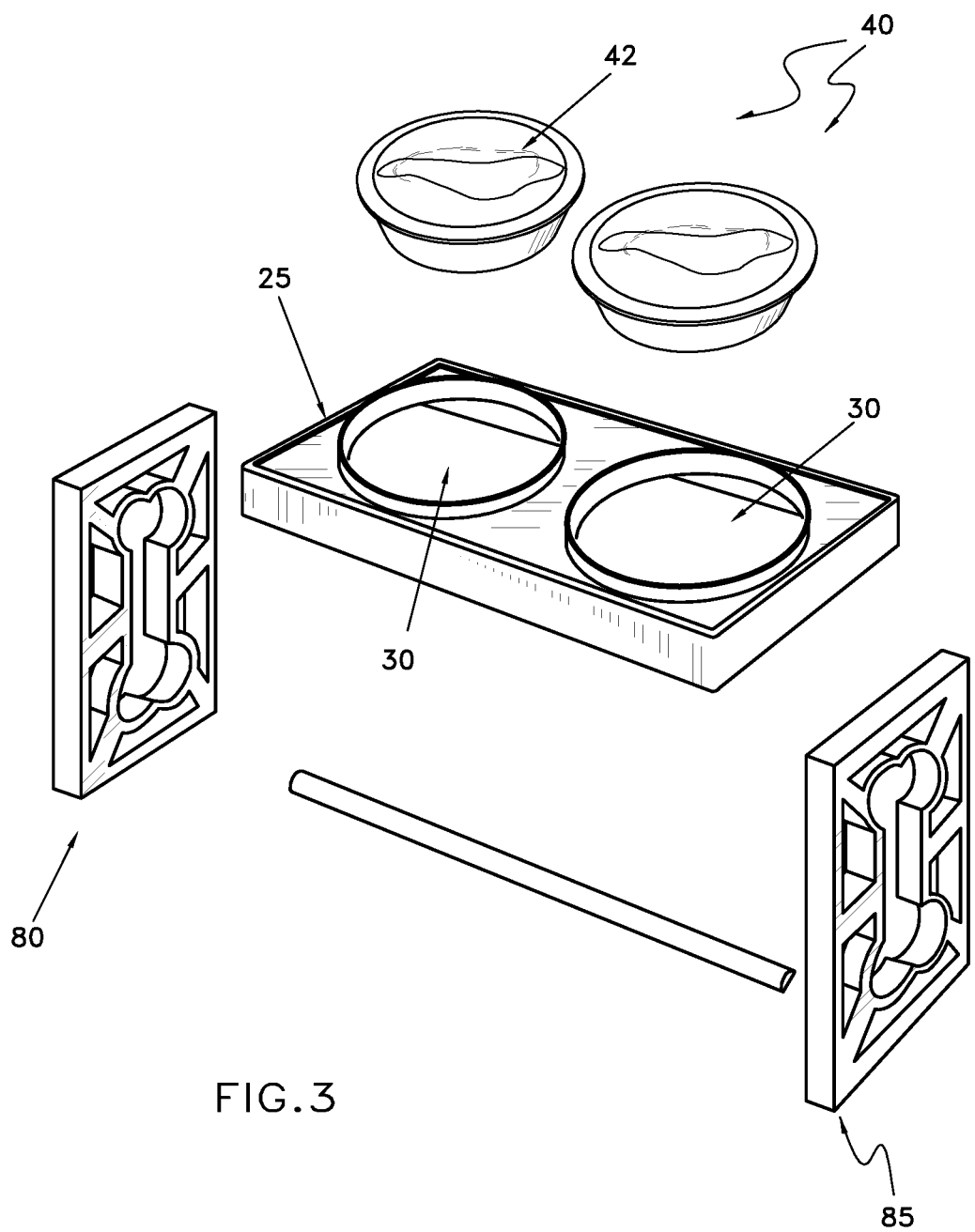
FIG. 3 is an exploded perspective view thereof.

The best mode for carrying out the invention is presented in terms of its preferred embodiment, herein depicted within FIG. 1a through 5. For purposes of the present disclosure, the terms "pet" or "domestic animal" are to be broadly construed to include dogs, cats, or other domestically maintained small animals. While the present preferred embodiment is shown and described as an elevated food and water station for use by a domestic canine, such a configuration should be construed as exemplary of the present teachings, and adaptations that allow accommodation of domesticated felines, guinea pigs, birds, ferrets or other commonly maintained domestic pet animals should be considered equivalent variations hereof.

1. DETAILED DESCRIPTION OF THE FIGURES

Referring now to FIG. 1a through FIG. 3, an improved elevated pet feeder is shown, generally noted as 10, according to the preferred embodiment of the present invention. The elevated pet feeder 10 utilizes a generally horizontal support platform 20 having a generally planar upper surface 25. At least one, and preferably a pair of generally circular receiving orifices 30 are formed within the planar upper surface 25, with each said receiving orifice 30 sized for and adapted to receive, hold and support an otherwise conventional bowl 40. As shown in accordance with a preferred embodiment of the present invention, each bowl 40 is configured as a small animal food or water bowl as is generally available in a variety of configurations. As shown, in an exemplary configuration an otherwise conventional metal bowl 40 is shown having a generally dome shaped receiving volume 42 in a generally round, open-top configuration adapted for serving food and/or water for access by a domestic pet. Each bowl 40 is typically small and shallow and has an upwardly directed opening 42. Further, in a preferred embodiment the bowl opening 42 is circumscribed by an annularly circumscribing flange 46. In such a configuration the receiving volume 42 may be lowered through and received by a receiving orifice 30 such as to allow the bowl flange 46 to impinge against the upper surface 25 for vertical support.

While the forgoing description of the preferred embodiment describes a particular configuration of bowl shape and platform with receiving orifice, it should be apparent to a person having ordinary skill in the relevant art, in light of the present teachings, that both the configuration of the bowl 40 and the number, shape and location of receiving orifice 30 should be broadly interpreted as exemplary of the present teachings, and that variations in the bowl size, style, shape, configurations and features would be equivalent of the particular embodiment depicted herein, as long as one or any number of such bowls 40 are received by and held vertically elevated by a corresponding platform 20 in a manner anticipated by the elevation mechanism described in greater detail below. As a result, additional features or functions in one or any number of bowls 40 should not be viewed as negating or teaching away from the present invention.

Figure 4:
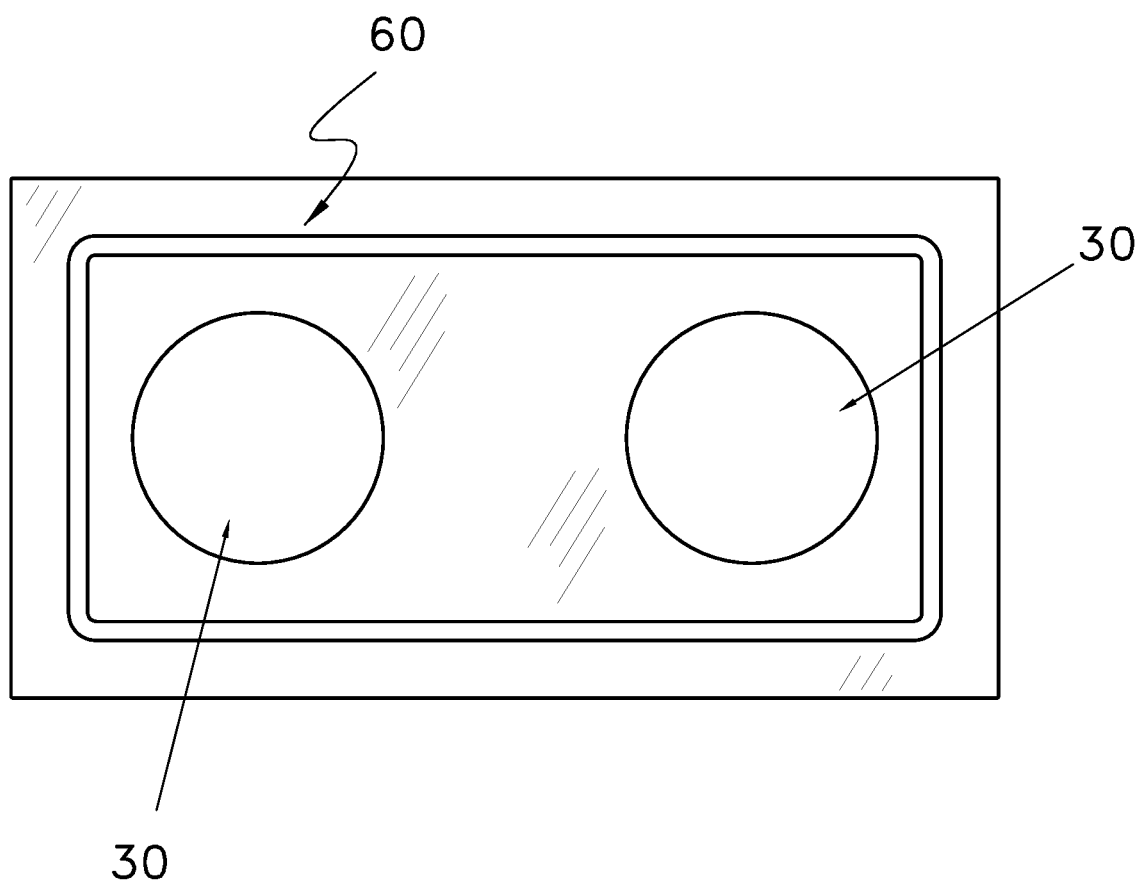
FIG. 4 is a top plan view thereof.

As shown in FIGS. 1a, 1b, 2a and 2b, and in further detail in FIG. 4, the platform 20 is broadly provided as forming a horizontally disposed, generally planar surface capable of being supported in a vertically elevated manner while simultaneously receiving or securing any number of food or drink receiving elements. While pet food or water bowls 40 are shown as removable features, such a configuration could be easily modified to incorporate fixed or non-removable food or drink receiving elements. Further, the size, shape and overall configuration of the platform 20 may provide a pallet for incorporation of other industrial design components having additional ornamental or aesthetic elements to provide a more decorative or fashionable domestic pet feeder design, while maintaining the basic functionality taught herein. An ability to provide for ongoing product design changes may further allow the present functions to be adapted over time to accommodate differing consumer preferences or style trends.

The bowl 40 may be of various designs, such as the one depicted in the figures. As shown, the bowl 40 comprises an annular sidewall 41 depending from a bottom surface 43, wherein the sidewall 41 terminates at an upper peripheral rim 45 opposite the bottom surface 43 that is coextensive with a bowl opening 42. Optionally, a flange 46 may be included along the upper portion and adjacent to the bowl opening 42. The sidewall 41 and bottom surface 42 each have an exterior surface and an interior surface, respectively.

As shown best in conjunction with FIG. 4, the upper platform surface 25 is anticipated as further forming an upwardly extended retention ridge 60. This ridge 60 may be continuously or intermittently positioned radially outward from and circumscribing at least a portion of one receiving orifice 30. In a preferred configuration, the ridge 60 is continuously formed in a manner circumscribing all receiving orifices 30 in a contiguous manner. The retention ridge 60 is designed for and intended to aid in prevention over splashing of food, water or the like from the feeders 40 when accessed and used by the domestic pet.

Figure 5:
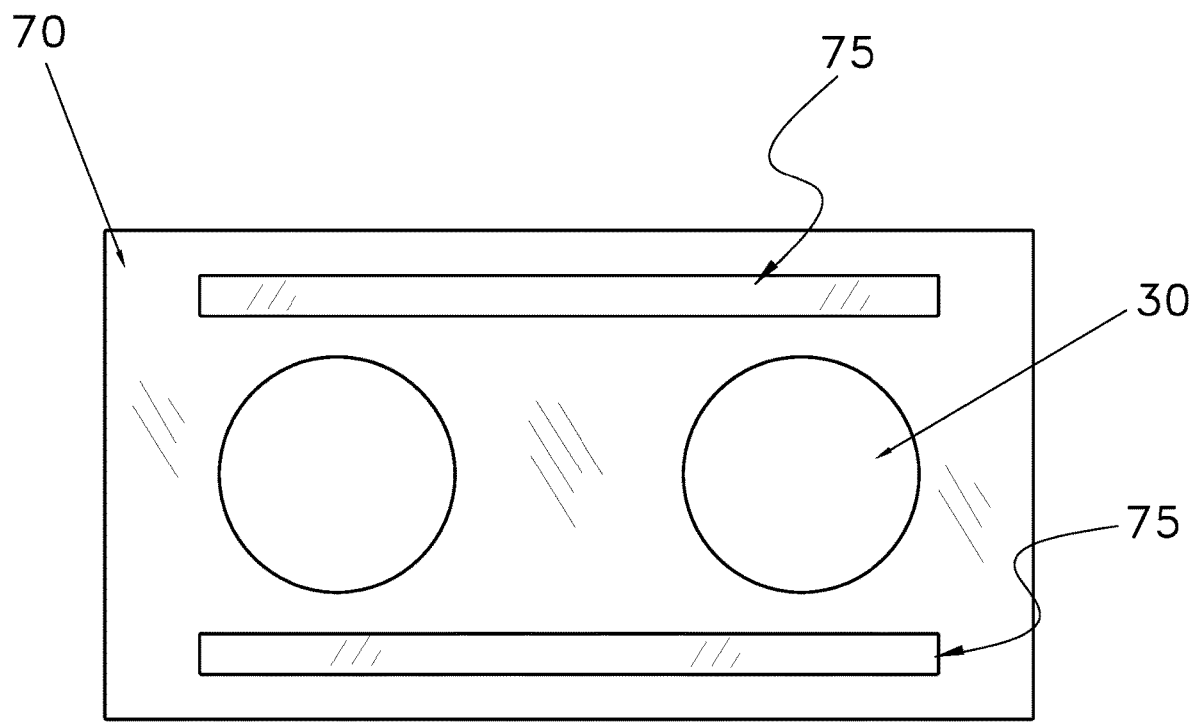
FIG. 5 is a bottom plan view of a support platform 20 for use in conjunction therewith.

Further, as best shown in conjunction with FIG. 5, the platform 20 further forms a lower platform surface 70 that is formed generally opposite the upper surface 25. The lower platform surface 70 forms a pair of first spaced, generally parallel leg receiving channels 75 along the length of the platform and a pair of second spaced, generally parallel leg receiving channels 76 along the width of the platform.

As shown throughout the figures, a first leg assembly 80 and second leg assembly 85 are provided in conjunction with the upper platform 20. Each leg assembly 80, 85 respectively are formed generally similar to each other in a generally rectangular configuration having a greater length 82 and a lesser width 84. The overall thickness of each leg assembly 80, 85 is provides such that a leg assembly can be frictionally retained within one respective leg receiving channel 75. The width of each receiving channel 75 and thickness of each leg assembly 80, 85 are intended to correspond to and provide a friction fit. While such a friction fit configuration is intended and preferred, it would be apparent to a person having ordinary skill in the relevant art, in light of the present teachings, to provide an additional attachment means, such as fasteners, connectors, adhesives, frictional enhancement means or other connection or attachment mechanisms.

2. OPERATION OF THE PREFERRED EMBODIMENT

To use the present invention in accordance with a preferred embodiment, the platform 25 is inverted to access the receiving channels 75. A first leg assembly 80 is received into a first channel 75 such that the leg assembly 80 is firmly retained in a configuration that is generally perpendicular to the lower surface 70. A second leg assembly 85 is then received into the remaining channel 75 in a similar fashion, such that the leg assembly 85 is firmly retained in a configuration that is generally perpendicular to the lower surface 70 and generally parallel with the first leg assembly 80.

It should be noted that a key functional element of the current invention is the ability to adjust the height of the platform 20 by selecting either the greater length 82 for placement into the channel 75 for elevating the platform 20 to a greater height. Alternately, by selecting the lesser width 84 for placement into the channel 75, the platform 20 may be elevated to a lesser heights. The greater height is adapted for accommodated larger dog breeds, such as, for example, sheppards, mastiffs, dalmatians, retrievers, greyhounds or the like. The lesser height is adapted for accommodate smaller dog breeds, such as, for example, beagles, pugs, dachshunds, spaniels, terriers or the like.

In addition to providing the opportunity for an easily assembled, knock-down (KD) elevated feeder design that is easy to assemble or adjust, the generally planar and overall rectangular configurations of the platform 20 and legs 80, 85 are readily adaptable to form a flat packing configuration in which the components are packaged in an economically and ergonomically convenient manner for transit or storage, as well as retail display.

Although it is a preferred embodiment of the present invention to use the elevated platform 20 with metal pet food and water bowls, other uses are clearly contemplated and should not be considered outside the scope of the invention. For instance, the present invention may be used with glass, plastic, or ceramic bowls instead.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An adjustable height, elevated feeder comprising:
   an elevated platform forming at least one receiving orifice for fittingly holding both a feeder and a water bowl, said platform having a length of a first dimension and a width of a second dimension;
   a pair of parallel disposed leg attachment connections formed on an underside surface of the platform along said length;
   a first regular geometric leg element having a long side having a first dimension and a short side having a second dimension;
   a second regular geometric leg element having a long side having a first dimension and a short side having a second dimension;
   wherein when the first regular geometric leg element is affixed to one of said disposed leg attachment connections and the second regular geometric leg element is affixed to one of said disposed leg attachment connections respectively along each long side said elevated platform is supported at a first height; and
   wherein when the first regular geometric leg element is affixed to one of said disposed leg attachment connections and the second regular geometric leg element is affixed to one of said disposed leg attachment connections respectively along each short side said elevated platform is supported at a second height.

2. The adjustable height, elevated feeder of claim 1, wherein said leg attachment connection further forms a receiving slot into which a regular geometric leg element capable of a press fit connection.

3. The adjustable height, elevated feeder of claim 2, wherein said first regular geometric leg element and said second regular geometric leg element each forms a rectangular planar member.

4. The adjustable height, elevated pet feeder of claim 3, wherein when each regular geometric leg element is removed from its disposed leg attachment connection and rotated only 90° in a single plane and reinserted along its second leg dimension, said platform is positioned to a second adjustment height.

5. The adjustable height, elevated pet feeder of claim 2, wherein when each regular geometric leg element is removed from the respective disposed leg attachment connection and rotated and reinserted along its second leg dimension, said platform is positioned to said second adjustment height.

6. The adjustable height, elevated feeder of claim 1, wherein said first regular geometric leg element and said second regular geometric leg element each forms a rectangular planar member.

7. The adjustable height, elevated feeder of claim 6, wherein said elevated platform has a generally rectangular shape having an overall planar surface area greater than an overall planar surface area of each said rectangular leg element.

8. The adjustable height, elevated feeder of claim 1, wherein said leg attachment connections are parallel to each other and said first regular geometric leg element and said second regular geometric leg element each forms a rectangular planar member.

9. The adjustable height, elevated feeder of claim 1, wherein said elevated platform further forms a pair of receiving orifices each adapted for removably receiving and holding either said feeder or said water bowl.

10. The adjustable height, elevated feeder of claim 1, wherein said elevated platform further comprises an elevated ridge circumscribing an upper surface for providing retention of spilled contents from said feeder or said water bowl.

11. The adjustable height, elevated feeder of claim 9, wherein said elevated platform further comprises an elevated ridge circumscribing an upper surface for providing retention of spilled contents from said feeder or said water bowl.

12. The adjustable height, elevated pet feeder of claim 1, wherein said at least one food or water bowl are affixed to or integrated with said platform.

13. The adjustable height, elevated feeder of claim 12, wherein said elevated platform further comprises an elevated ridge circumscribing an upper surface for providing retention of spilled contents from said feeder or said water bowl.

\* \* \* \* \*